United States Patent
Mao et al.

(10) Patent No.: US 10,036,442 B2
(45) Date of Patent: Jul. 31, 2018

(54) ELASTIC MEMBER AND VIBRATING MOTOR USING SAME

(71) Applicants: LuBin Mao, Shenzhen (CN); Fei Hou, Shenzhen (CN); HongXing Wang, Shenzhen (CN)

(72) Inventors: LuBin Mao, Shenzhen (CN); Fei Hou, Shenzhen (CN); HongXing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 245 days.

(21) Appl. No.: 15/080,290

(22) Filed: Mar. 24, 2016

(65) Prior Publication Data

US 2017/0025936 A1    Jan. 26, 2017

(30) Foreign Application Priority Data

Jul. 24, 2015  (CN) .......................... 2015 1 0443104

(51) Int. Cl.
  *H02K 33/00*   (2006.01)
  *F16F 3/02*    (2006.01)
  *H02K 33/02*   (2006.01)

(52) U.S. Cl.
  CPC ............. *F16F 3/023* (2013.01); *H02K 33/02* (2013.01)

(58) Field of Classification Search
  CPC ............................... H02K 33/00; H02K 33/02
  USPC .............................................................. 310/25
  See application file for complete search history.

(56) References Cited

U.S. PATENT DOCUMENTS

| | | | |
|---|---|---|---|
| 2011/0101798 A1* | 5/2011 | Lee ........................ | H02K 33/16 310/29 |
| 2012/0104875 A1* | 5/2012 | Park ....................... | H02K 33/16 310/25 |
| 2012/0169148 A1* | 7/2012 | Kim ....................... | H02K 33/16 310/25 |
| 2012/0169151 A1* | 7/2012 | Dong ..................... | H02K 33/16 310/25 |

* cited by examiner

*Primary Examiner* — Hanh Nguyen
(74) *Attorney, Agent, or Firm* — Na Xu; IPro, PLLC

(57) ABSTRACT

An elastic member is provided in the present disclosure. The elastic member includes a first elastic part for providing a first amplitude and a second elastic part connected to the first elastic part for providing a second amplitude. The first elastic part includes a first connecting part and a first connecting arm extending from the first connecting part; the second elastic part includes a second connecting arm and a second connecting part extending from the second connecting arm; the second connecting part is parallel to the first connecting part, the second connecting arm extends substantially towards the first connecting parts. A vibrating motor using the elastic member is also provided in the present disclosure.

17 Claims, 3 Drawing Sheets

ELASTIC MEMBER AND VIBRATING MOTOR USING SAME

FIELD OF THE DISCLOSURE

The present disclosure generally relates to vibrating motor technologies, and more particularly, to an elastic member used in a vibrating motor.

BACKGROUND

Portable consumer products, such as mobile phones, handheld game players, navigation devices and portable multi-media players, generally include vibrating motors for generating vibration feedback. For example, the vibrating motor may be used in a mobile phone for providing vibrating system feedback while receiving an incoming call, or used in a portable multi-media player for providing haptic feedback.

A typical vibrating motor includes a shell, a vibrating module and a pair of elastic members; the elastic members are connected between the vibrating module and the shell for suspending the vibrating module in the shell. FIG. 1 illustrates a related elastic member 10 applicable to the vibrating motor, the elastic member 10 has a U-shaped structure and includes a pair of connecting parts 11 and a connecting arm 12 connected between the pair of connecting parts 11. An amplitude (labeled with A) of the elastic member 10, which is relevant to a vibration amplitude of the vibrating module, is mainly determined by a length (labeled with L) of the connecting arm 12.

To enable the vibrating module to have a sufficient vibration amplitude, the connecting arm 12 needs to be unduly long, otherwise, the elastic member 10 may suffer fracture due to a serious stress of the elastic member 10. However, the long connecting arm 12 may not meet miniaturization requirement of the vibrating motor.

Therefore, it is desired to provide an elastic member to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
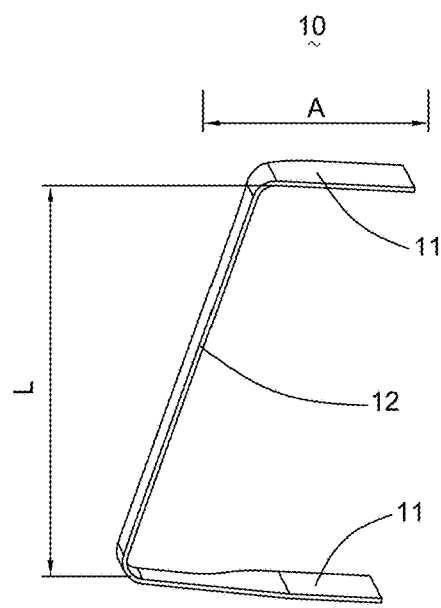
FIG. 1 is a schematic view of an elastic member in a related vibrating motor.
Figure 2:
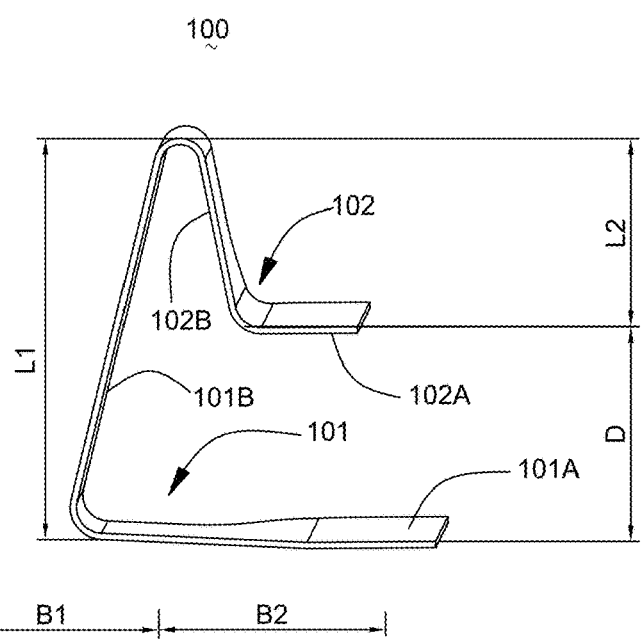
FIG. 2 is a schematic view of an elastic member according to a first exemplary embodiment of the present disclosure.
Figure 3:
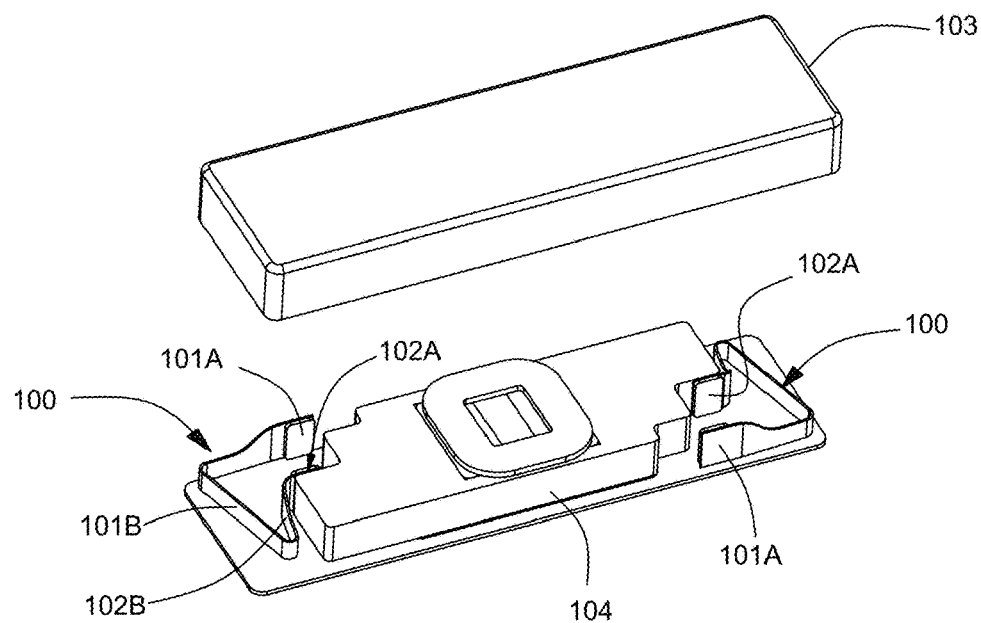
FIG. 3 is a schematic view of a vibrating motor using the elastic member of FIG. 2.

Referring to FIG. 2, an elastic member 100 according to a first exemplary embodiment of the present disclosure is shown. The elastic member 100 is applicable to a vibrating motor as illustrated in FIG. 3; the elastic member 100 includes a first elastic part 101 for providing a first amplitude B1, and a second elastic part 102 for providing a second amplitude B2. The first elastic part 101 and the second elastic part 102 are integrated into a one-piece structure.

The first elastic part 101 includes a first connecting part 101A and a first connecting arm 101B extending from the first connecting part 101A. A first angle between the first connecting part 101A and the first connecting arm 101B is an acute angle. The second elastic part 102 includes a second connecting arm 102B and a second connecting part 102A extending from the second connecting arm 102B. A second angle between the second connecting part 102A and the second connecting arm 102B is an obtuse angle. Additionally, the second connecting arm 102B extends from a distal end of the first connecting arm 101B in a direction substantially towards the first connecting ends 101A.

In particular, the first connecting arm 101B and the second connecting arm 102B are connected to each other in an arc-shaped connection configuration; the arc-shaped transition configuration is adopted to reduce a stress between the first connecting arm 101B and the second connecting arm 102B. Similarly, arc-shaped transitions may also be formed in the connection between the first connecting part 101A and the first connecting arm 101B, as well as the connection between the second connecting part 102A and the second connecting arm 102B.

In the present embodiment, an extending direction of the second connecting part 102A is parallel to that of the first connecting part 101A, which may further be parallel to a vibration direction of a vibration module of the vibrating motor in which elastic member 100 is applied. In a direction perpendicular to the first connecting part 101A and the second connecting part 102A, the first connecting arm 101B has a first length L1, and the second connecting arm 102B has a second length L2. Additionally, the second length L2 is smaller than the first length L1, and consequently, a distance D exists between the first connecting part 101A and the second connecting part 102A. With this configuration, an overall length of the elastic member 100 is the first length L1 of the first connecting arm 101B.

Referring to FIG. 3, a vibrating motor using a pair of elastic members 100 as illustrated in FIG. 2 is shown. The vibrating motor includes a shell 103, a vibrating module 104 received in the shell 103, and a pair of elastic members 100 suspending the vibrating module 104. An end of the vibrating module 104 is elastically connected to the shell 103 by one of the elastic members 100, and an opposite end of the vibrating module 104 is elastically connected to the shell 103 by the other one of the elastic members 100.

The first connecting arm 101B with the first length L1 enables the vibrating module 104 to obtain the first amplitude B1, the second connecting arm 102B with the second length L2 enables the vibrating module 104 to obtain the second amplitude B2, and therefore an overall vibration amplitude of the vibrating module 104 is calculated as B1+B2. That's to say, due to the second elastic part 102 of the elastic member 100, the overall vibration amplitude of the vibrating module 104 increases compared with using a U-shaped elastic member. This can ensure the vibrating module 104 to have sufficient vibration amplitude without increasing an overall length of the elastic member 100, and therefore, the miniaturization requirement of the vibrating motor can also be satisfied.

Additionally, even if the overall length of the elastic members 100 needs to be reduced, the first connecting arm 101B can be designed shorter while the second connecting arm 102B can be designed longer. In this circumstance, the first amplitude B1 is decreased while the second amplitude B2 is increase. As such, the vibrating module 104 can maintain the sufficient vibration amplitude, and moreover, the elastic members 100 can have a shorter length as desired without suffering excessive stress. Therefore, reliability of both elastic member 100 and the vibrating motor can be improved.

Figure 4:
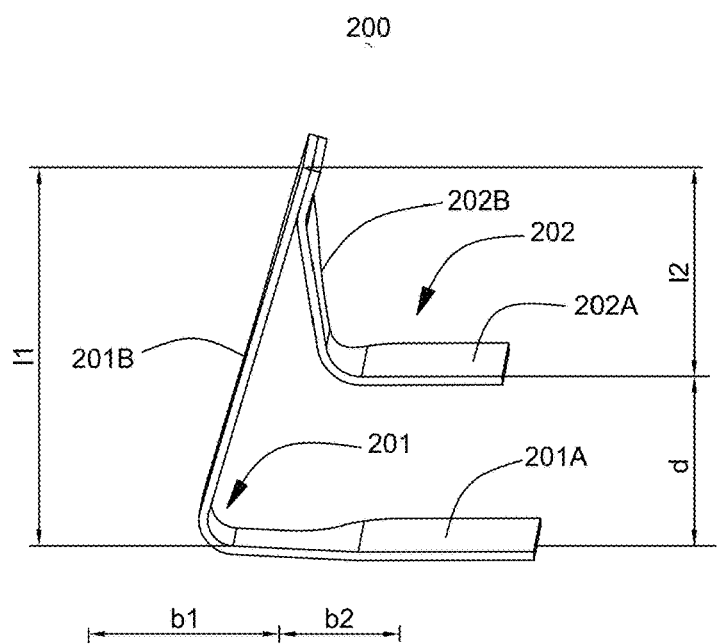
FIG. 4 is a schematic view of an elastic member according to a second exemplary embodiment of the present disclosure.

Referring to FIG. 4, an elastic member 200 according to a second exemplary embodiment of the present disclosure is shown. The elastic member 200 includes a first elastic part 201 for providing a first amplitude b1, and a second elastic part 202 for providing a second amplitude b2.

The first elastic part 201 includes a first connecting part 201A and a first connecting arm 201B extending from the first connecting part 201A. A first angle between the first connecting part 201A and the first connecting arm 201B is an acute angle. The second connecting part 202 includes a second connecting arm 202B and a second connecting part 202A extending from the second connecting arm 202B. The second connecting arm 202B extends from a distal end of the first connecting arm 201B in a direction substantially towards the first connecting part 201A. A second angle between the second connecting part 202A and the second connecting arm 202B is an obtuse angle.

A difference between the elastic member 200 as provided in the second embodiment and the elastic member 100 as provided in the first embodiment is that the first elastic part 201 and the second elastic part 202 are two independent components, and the first connecting arm 201B is welded to the second connecting arm 202B. In addition, the arc-shaped transitions are also formed in the connection between the first connecting part 201A and the first connecting arm 201B, as well as the connection between the second connecting part 202A and the second connecting arm 202B.

In the present embodiment, an extending direction of the second connecting part 202A is parallel to that of the first connecting part 201A, which may further be parallel to a vibration direction of a vibration module of the vibrating motor in which elastic member 200 is applied. In a direction perpendicular to the first connecting part 201A and the second connecting part 202A, the first connecting arm 201B has a first length l1; the second connecting arm 202B has a second length l2. Additionally, the second length l2 is smaller than the first length l1, and consequently, a distance d exists between the first connecting part 201A and the second connecting part 202A. With this configuration, an overall length of the elastic member 200 is the first length l1 of the first connecting arm 201B.

Figure 5:
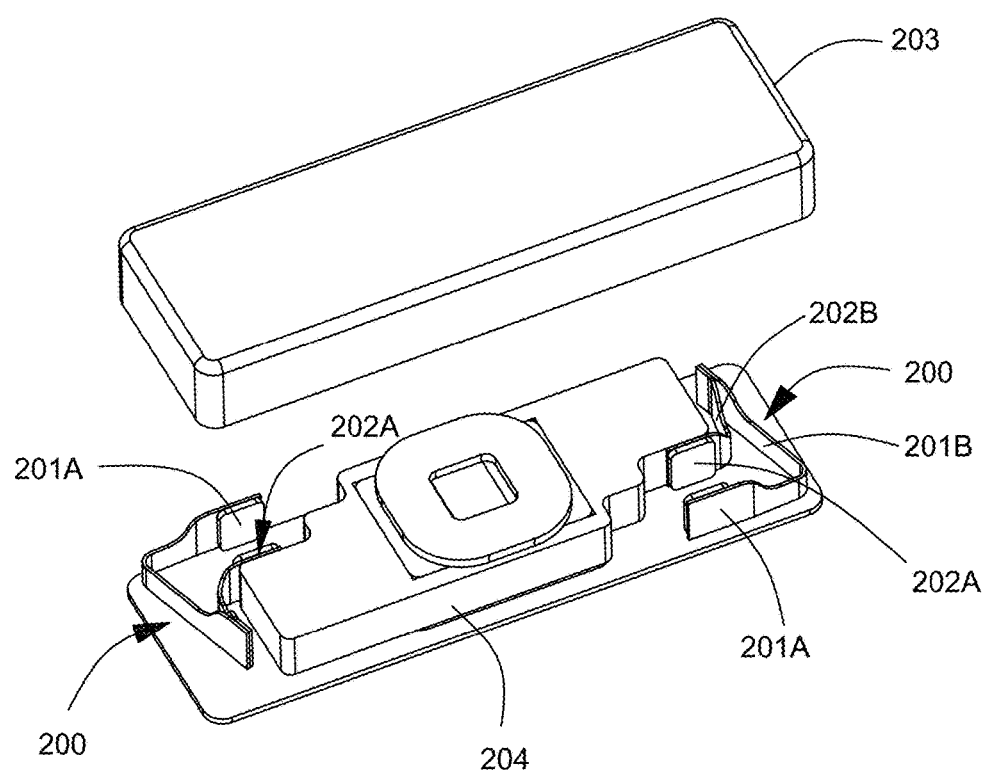
FIG. 5 is a schematic view of a vibrating motor using the elastic member of FIG. 4.

Referring to FIG. 5, a vibrating motor using a pair of elastic members 200 as illustrated in FIG. 4 is shown. The vibrating motor includes a shell 203, a vibrating module 204 received in the shell 203, and a pair of elastic members 200 suspending the vibrating module 204. An end of the vibrating module 204 is elastically connected to the shell 203 by one of the elastic members 200 and an opposite end of the vibrating module 204 is elastically connected to the shell 103 by the other one of the elastic members 200.

The first connecting arm 201B with the first length l1 enables the vibrating module 204 to obtain the first amplitude b1, the second connecting arm 202B with the second length l2 enables the vibrating module 204 to obtain the second amplitude b2, and therefore an overall vibration amplitude of the vibrating module 204 is calculated as b1+b2. That's to say, due to the second connecting part 202 of the elastic member 200, the overall vibration amplitude of the vibrating module 204 increases compared with using a U-shaped elastic member. This can ensure the vibrating module 204 to have sufficient vibration amplitude without increasing an overall length of the elastic member 200, and therefore, the miniaturization requirement of the vibrating motor can also be satisfied.

In the present embodiment, the second connecting part is introduced into the elastic member for enabling the vibrating module to obtain the second amplitude in the vibrating motor, and therefore the overall vibration amplitude of the vibrating module increases compared with using a U-shaped elastic member. With this configuration, the vibrating module is ensured to have sufficient vibration amplitude without increasing an overall length of the elastic member, and thereby satisfying the miniaturization requirement of the vibrating motor.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An elastic member, comprising:
a first elastic part for providing a first amplitude;
a second elastic part connected to the first elastic part for providing a second amplitude; wherein the first elastic part comprises a first connecting part and a first connecting arm extending from the first connecting part; the second elastic part comprises a second connecting arm and a second connecting part extending from the second connecting arm; the second connecting part is parallel to the first connecting part, the second connecting arm extends towards the first connecting parts; wherein a second arc-shaped transition is formed between the second connecting part and the second connecting arm, a second angle between the second connecting part and the second connecting arm is an obtuse angle.

2. The elastic member as described in claim 1, wherein a first arc-shaped transition is formed between the first connecting part and the first connecting arm, a first angle between the first connecting part and the first connecting arm is an acute angle.

3. The elastic member as described in claim 1, wherein the first connecting arm has a first length greater than a second length of the second connecting arm.

4. The elastic member as described in claim 3, wherein an overall length of the elastic member is determined by the first length of the first connecting arm.

5. The elastic member as described in claim 1, wherein a distance exists between the first connecting part of the first elastic part and the second connecting part of the second elastic part.

6. The elastic member as described in claim 1, wherein the first connecting arm and the second connecting arm are connected to each other in an arc-shaped connection configuration.

7. The elastic member as described in claim 6, wherein the first elastic part and the second elastic part are integrated into a one-piece structure.

8. The elastic member as described in claim 1, wherein the first elastic part and the second elastic part are two independent components; the first connecting arm is welded to the second connecting arm.

9. A vibrating motor, comprising:
a shell providing a receiving cavity;
a vibrating module received in the receiving cavity for generating a linear vibration;
a pair of elastic members for suspending the vibrating module; wherein
each of the elastic members comprises a first elastic part for providing a first amplitude, and a second elastic part connected to the first elastic part for providing a second amplitude; and
the first elastic part comprises a first connecting part and a first connecting arm extending from the first connecting part; the second elastic part comprises a second connecting arm and a second connecting part extending from the second connecting arm; the second connecting part is parallel to the first connecting part, the second connecting arm extends towards the first connecting parts;
wherein a second arc-shaped transition is formed between the second connecting part and the second connecting arm, a second angle between the second connecting part and the second connecting arm is an obtuse angle.

10. The vibrating motor as described in claim 9, wherein a first arc-shaped transition is formed between the first connecting part and the first connecting arm, a first angle between the first connecting part and the first connecting arm is an acute angle.

11. The vibrating motor as described in claim 9, wherein the first connecting arm has a first length greater than a second length of the second connecting arm.

12. The vibrating motor as described in claim 11, wherein an overall length of the elastic member is determined by the first length of the first connecting arm.

13. The vibrating motor as described in claim 9, wherein a distance exists between the first connecting part of the first elastic part and the second connecting part of the second elastic part.

14. The vibrating motor as described in claim 9, wherein the first connecting arm and the second connecting arm are connected to each other in the arc-shaped connection configuration.

15. The vibrating motor as described in claim 14, wherein the first connecting arm and the second connecting arm are integrated into a one-piece structure.

16. The vibrating motor as described in claim 9, wherein the first elastic part and the second elastic part are two independent components; the first connecting arm is welded to the second connecting arm.

17. The vibrating motor as described in claim 9, the first connecting arm enables the vibrating module to obtain the first amplitude, the second connecting arm enables the vibrating module to obtain the second amplitude, and an overall vibration amplitude of the vibrating module is a sum of the first amplitude and the second amplitude.

* * * * *